Nov. 29, 1960 W. H. P. POULIART ET AL 2,962,200

GUIDING MEANS FOR A MAGNETIC TAPE

Filed Aug. 30, 1954

*Inventors*
W. H. P. POULIART
F. M. MICHIELS
By *Philip M. Bolton*
*Attorney*

United States Patent Office 2,962,200

Patented Nov. 29, 1960

2,962,200

GUIDING MEANS FOR A MAGNETIC TAPE

Willy Hortense Prosper Pouliart and Franciscus Marcel Michiels, Antwerp, Belgium, assignors to International Standard Electric Corporation, New York, N.Y., a corporation of Delaware Filed Aug. 30, 1954, Ser. No. 453,093

Claims priority, application Belgium Oct. 15, 1953

2 Claims. (Cl. 226—95)

The present invention relates to improvements to guiding means for a magnetic tape.

It applies mainly to apparatus comprising on the one end, a magnetic tape driving device, for instance friction rollers, and on the other end a storage box in which the tape is housed. Such devices are described in South African Patent No. 7752. It applies more particularly to apparatus comprising a high speed pneumatic drive device for a magnetic tape capable of stopping and starting very rapidly. Such a device is described in Belgian Patent No. 517,967.

However, in the apparatus comprising these devices, the high linear speed of the tape causes certain problems, in particular, how to maintain the tape running against the reading and writing heads without excessive friction; and also, how to have a normal unrolling of the tape without mechanical or electrical interference between the various regions of its periphery.

For instance, the application of a tape on the heads by means of rollers or guiding surfaces, produces a frictional force which slows down the linear speed of the tape and increases the wear thereof. Further, the frictional force gives rise to electrostatic charges which are conveyed by the tape. These charges are added to those generated by the sliding of the tape caused by the inertia of the tape on the driving device at the stops and starts.

It has been shown by experience that the charges localized on the tape periphery are not identical at all points. In particular, they are opposite in sign at the slack and tight sides of the tape. From this there results an attraction between sides which are detrimental to the proper unrolling of the tape prior to the reading and the rolling of the tape after it is read.

The object of the present invention is to overcome these drawbacks.

According to a feature of the invention, one face of the magnetic tape is applied to the reading and writing head by means of a first adjustable air pressure directed at the other face of the tape.

According to another feature of the invention, the slack and the tight sides of the tape are kept apart one from the other by means of a second adjustable air pressure introduced in the storage box.

According to another feature of the invention, the first air pressure is directed perpendicularly to the useful surface of the reading head, by means of a nozzle with multiple ports, and the second air pressure is directed in the storage box so as to increase preferably the spacing between one of the sides with respect to the other by means of the vent-holes connected to piping ramifications.

According to still another feature of the invention, the first and second air pressures are obtained from a common piping means, a separate adjusting device being provided for each pressure.

According to a further feature of the invention, the common piping, the separate adjusting devices, the nozzle, the vent-holes and their piping ramification form part of a common casing.

The above mentioned and other objects and features of the invention will become more apparent and the invention itself will be best understood by referring to the following description of an embodiment taken in conjunction with the accompanying drawings in which.

Figure 1:
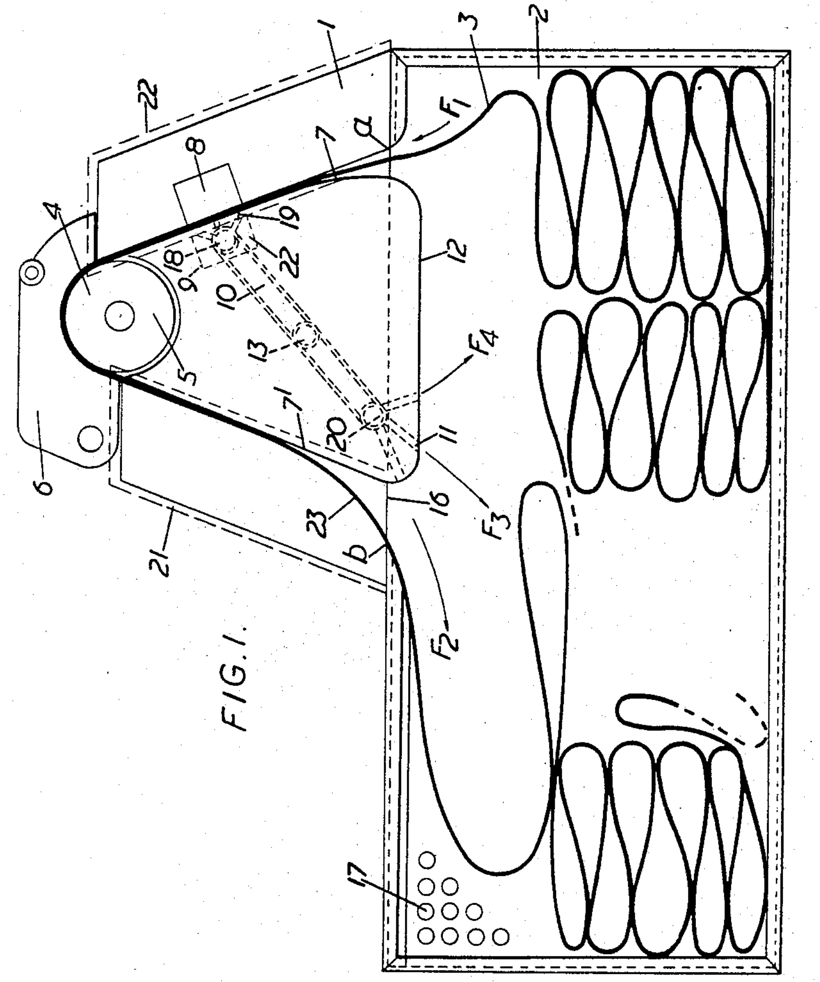
Fig. 1 shows a schematic elevated drawing of a pneumatic guiding device for a magnetic tape, associated with a storage box according to the invention.

Referring to Fig. 1, it can be seen that the guiding device 1 is associated with a storage box 2 which contains the magnetic tape 3. The guiding device 1 comprises a pneumatic driving device 4, similar to the one described in Belgian Patent No. 517,967. It is represented schematically by the driving wheel 5 and by a supply casing 6. The device 1 further comprises passages 7 and 7' for guiding the tape 3 and in the path thereof reading and writing heads 8.

Figure 2:
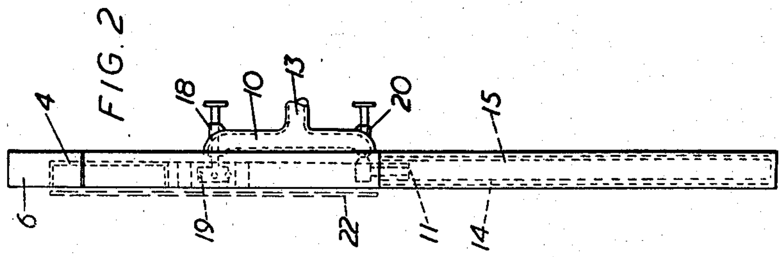
Fig. 2 shows a side view of the same device.

Opposite to the heads 8, a nozzle 9 is connected to the main piping 10, which also supplies apertures such as 11, supplied in protrusion 12 of the device 1. The piping 10 is itself supplied by a joint 13 and the flow of the nozzle and of the vent-holes are adjusted by individual valves 18 and 20 which can be seen on Fig. 2.

The storage box 2 is of rectangular shape, and has been described in the South African Patent No. 7752. The space provided between the two walls 14 and 15 is so calculated that the magnetic tape 3 can move through it without friction and yet without excessive looseness. The storage box 2 has two openings, one 16 which extends from *a* to *b* and the other 17 which may carry multiple ports. The opening 16 is covered by the device 1 and receives the protrusion 12 of the device. The openings 17 is used as exhaust, as will be explained hereinbelow. If required, the junction between the device 1 and the storage box 2 can be made airtight. As shown on Fig. 1, the passage 7 emerges in the storage box at the extreme right (side *a*) of opening 16, it passes between the heads 8 and the nozzle 9 and then links up tangentially to the wheel 5 of the pneumatic driving device. The passage 7 is extended by a space provided between the wheel 5 and the casing 6. The passage 7' links up tangentially to the wheel 5 and emerges by the junction 23 to the extreme left (side *b*) of the opening 16 of the storage box 2. The tape 3 stored in the storage box 2 follows the travel along passages 7 and 7' via a passage on the wheel 5.

Let us assume that the tape 3 is driven by the wheel 5 in the direction of arrow $F_1$, as described in Belgian Patent No. 517,967. The tape 3 leaves and enters respectively the storage box 2 by the passages 7 and 7'. In order that tape 3 may be perfectly applied on the reading and printing heads with a minimum friction, a first air pressure issued from pipe 10 passes through a valve 18 and passes out through the nozzle 9, perforated with the multiple ports 19. This first air pressure is adjustable by means of valve 18.

On the other hand a second air pressure, directed along directions $F_2$, $F_3$, $F_4$ passes out through the corresponding apertures such as 11, so that the tape 3 is blown towards the left of the storage box 2 in Fig. 1. The air then escapes by the exhaust holes 17. The second air pressure has therefore a strong action on the left side of the tape (Fig. 1) so as to keep it as far as possible from the right side. In this manner, the clingings between the slack and tight sides of tape 3 due to electrostatic charges are eliminated. The second air pressure is adjustable by means of valve 20 which allows the control of the regularity of storage of the tape 3 in the storage box 2.

The widths of the passages 7 and 7' are limited to the width of the tape 3 and the lateral motion is limited by removable and transparent shields such as 21 and 22.

While the principles of the invention have been described above in connection with specific embodiments and particular modifications thereof, it is to be clearly understood that this description is made only by way of example and not as a limitation on the scope of the invention.

What is claimed is:

1. In an endless tape storing system, an endless tape, a compartment for confining a substantial portion of said endless tape, said compartment having a first and a second end and having a first opening through which said tape is fed into the compartment and a second opening through which said tape is fed out of said compartment, and means for arranging said tape in said compartment in an orderly manner to prevent entanglement, said arranging means including means for producing a first air stream directed against the incoming portions of said endless tape to cause it to form successive loops adjacent said first end of said compartment and for producing a second air stream directed against the outgoing portions of said endless tape to cause said formed loops to move from said first end of said compartment to said second end, said first and second air streams being directed towards said first and second ends of said compartment respectively to maintain the incoming portions of said tape separated from said outgoing portions, whereby newly formed loops adjacent said first end of said compartment do not become entangled with said loops moved to said second end.

2. In an endless tape storing system as set forth in claim 1, said arranging means including a third air stream directed intermediate said first and second ends to control the positioning of the formed loops and to prevent substantial vertical movement of the formed loops during their movement from the said first end of said compartment to said second end.

References Cited in the file of this patent

UNITED STATES PATENTS

| | | |
|---|---|---|
| 1,296,476 | Burnett | Mar. 4, 1919 |
| 1,847,915 | Bailey | Mar. 1, 1932 |
| 1,853,966 | Eckert | Apr. 12, 1932 |
| 1,883,987 | Lasowsky | Oct. 25, 1932 |
| 2,037,806 | Little | Apr. 21, 1936 |
| 2,529,184 | Pearson | Nov. 7, 1950 |
| 2,542,506 | Gibson | Feb. 20, 1951 |
| 2,612,566 | Anderson et al. | Sept. 30, 1952 |
| 2,678,173 | Phelps | May 11, 1954 |
| 2,778,634 | Gams et al. | Jan. 22, 1957 |
| 2,808,259 | Wengel | Oct. 1, 1957 |

FOREIGN PATENTS

| | | |
|---|---|---|
| 1,085,854 | France | Aug. 4, 1954 |